US012633172B2

(12) United States Patent
Schneiderhan et al.

(10) Patent No.: US 12,633,172 B2
(45) Date of Patent: May 19, 2026

(54) METHOD FOR MANAGING A DATA EXCHANGE BETWEEN A VEHICLE-INTERNAL COMPUTING UNIT AND A VEHICLE-EXTERNAL COMPUTING UNIT

(71) Applicant: Robert Bosch GmbH, Stuttgart (DE)

(72) Inventors: Dirk Schneiderhan, Ludwigsburg (DE); Achim Haegele, Fichtenberg (DE); Amirthalingam Navinkumar, Bangalore (IN); Andreas Schulz, Loewenstein-Hoesslinsuelz (DE); Andreas Hoffmann, Obersulm (DE); Dimitrios Stavrianos, Stuttgart (DE); Jan Pepke, Remseck A.N. (DE); Manoharan Hari Prasad, Bangalore (IN); Sebastian Kirsch, Renningen (DE); Shawn Williamson, Flein (DE); Simon Hauber, Freiberg Am Neckar (DE); Subramaniam Tamilselvi, Bangalore (IN); Thilo Stephan, Heilbronn (DE); Waldemar Krapp, Flein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 132 days.

(21) Appl. No.: 18/593,347

(22) Filed: Mar. 1, 2024

(65) Prior Publication Data
US 2024/0304036 A1      Sep. 12, 2024

(30) Foreign Application Priority Data
Mar. 7, 2023    (DE) ..................... 10 2023 202 010.6

(51) Int. Cl.
    *G06F 8/65* (2018.01)
    *G06F 21/53* (2013.01)
    (Continued)

(52) U.S. Cl.
    CPC ............. *G07C 5/008* (2013.01); *G06F 21/53* (2013.01); *H04W 4/40* (2018.02); *G06F 8/65* (2013.01)

(58) Field of Classification Search
    CPC .......... G07C 5/008; H04W 4/40; G06F 21/53; G06F 8/65
    See application file for complete search history.

(56) References Cited

U.S. PATENT DOCUMENTS

2021/0112441 A1*    4/2021    Sabella ................. H04W 24/04
2023/0021594 A1*    1/2023    Jauss ....................... G06F 21/53

FOREIGN PATENT DOCUMENTS

DE          10143556 A1      3/2003
EP          0708427 A2       4/1996

OTHER PUBLICATIONS

Plappert, et al., "A Privacy-Aware Data Access System for Automotive Applications," 15th Escar Europe, Berlin, Germany, 2017, pp. 1-11.

(Continued)

*Primary Examiner* — Adnan M Mirza
(74) *Attorney, Agent, or Firm* — NORTON ROSE FULBRIGHT US LLP

(57) ABSTRACT
A method for managing a data exchange between a vehicle-internal computing unit and a vehicle-external computing unit. The method includes: receiving or reading in, by a management unit, function data of the vehicle-internal computing unit, wherein the function data relate to an operation of the vehicle; processing the function data by the management unit; generating data messages by the management unit (Continued)

depending on the function data processed; storing the data messages in a memory unit in the management unit; and transmitting the data messages stored in the memory unit by the management unit to a communication interface of the vehicle-internal computing unit in order to transmit the data messages from the vehicle-internal computing unit to the vehicle-external computing unit.

17 Claims, 3 Drawing Sheets

(51) Int. Cl.
  *G07C 5/00*             (2006.01)
  *H04W 4/40*            (2018.01)

(56)                 References Cited

OTHER PUBLICATIONS

"Circular Buffer," Wikipedia, the Free Encyclopedia, 2023, pp. 1-5.

* cited by examiner

Figure 3:
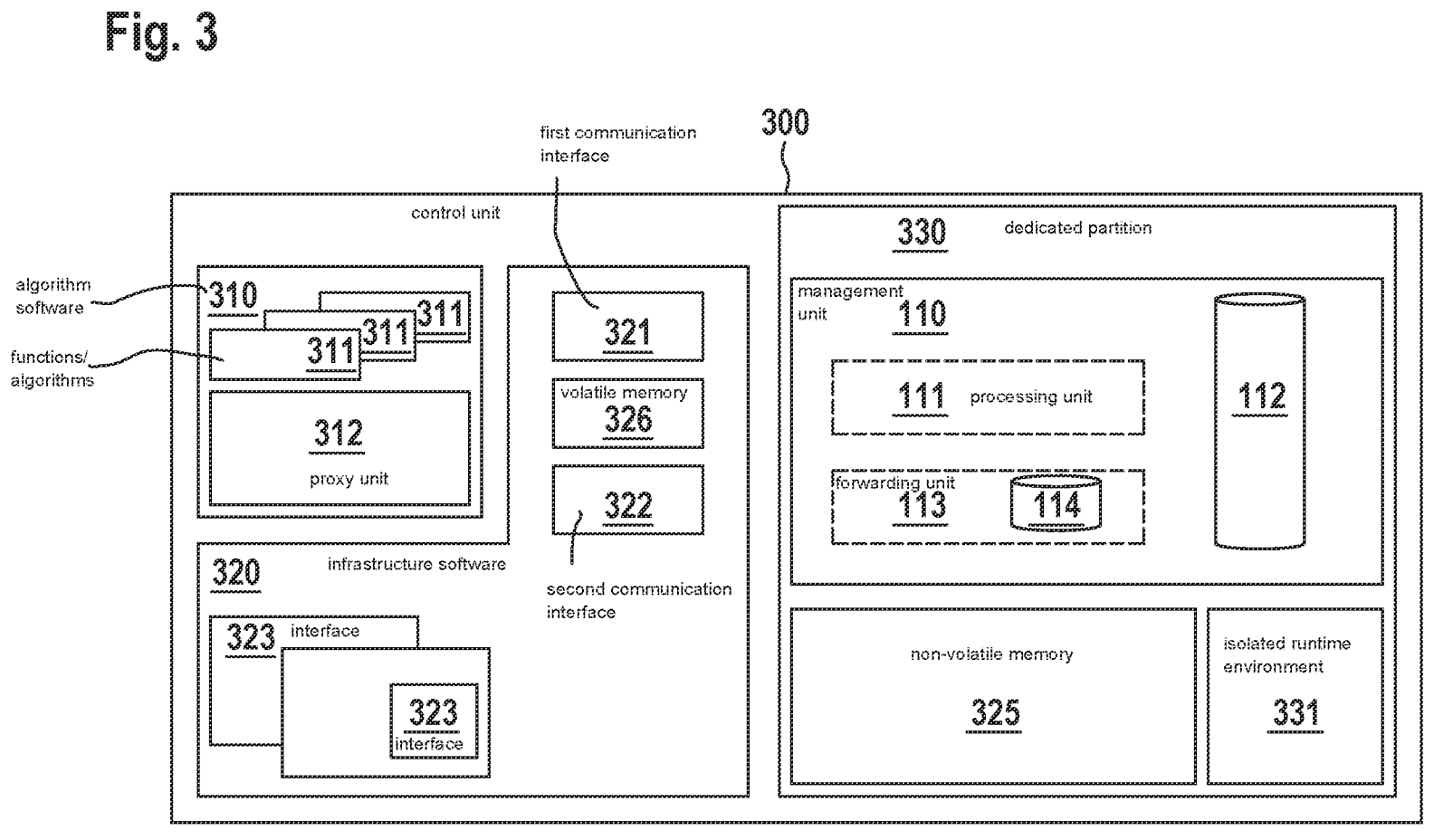

Fig. 3 algorithm
software functions/
algorithms

300 first communication
interface control unit

310

311
311
311

312 proxy unit

320 infrastructure software 323 interface

323 interface second communication
interface

321 volatile memory
326

322 dedicated partition

330 management
unit
110

111 processing unit forwarding unit
113

114

112 non-volatile memory

325 isolated runtime
environment

331

METHOD FOR MANAGING A DATA EXCHANGE BETWEEN A VEHICLE-INTERNAL COMPUTING UNIT AND A VEHICLE-EXTERNAL COMPUTING UNIT

CROSS REFERENCE

The present application claims the benefit under 35 U.S.C. § 119 of German Patent Application No. DE 10 2023 202 010.6 filed on Mar. 7, 2023, which is expressly incorporated herein by reference in its entirety.

FIELD

The present invention relates to a method, a management unit, and a system for managing a data exchange between a vehicle-internal computing unit and a vehicle-external computing unit, and a computer program.

BACKGROUND INFORMATION

Computing units in (motor) vehicles, such as microcontrollers or control units, can receive and transmit function data or function signals required for the operation of the vehicle via a communication system of the vehicle, for example a fieldbus system such as CAN, Flexray, etc. Such function signals can be sensor data captured by sensors, for example, or control data for controlling actuators. These function data or function signals are usually provided only for vehicle-internal communication and not for communication to the outside.

It can often also be desired to transmit data from the vehicle to a vehicle-external computing unit, for example to a remote computing unit such as a server or a so-called cloud, in order to be able to analyze these data there. Such data are not usually required for regular operation of the vehicle and in the present context are referred to as non-function data or non-function signals. For example, such non-function data can be transmitted from a special vehicle-internal computing unit, for example from a central vehicle computer or a telematics unit, to the vehicle-external computing unit, which has a communication interface to the outside, for example via a connection to a cellular network, etc.

In internal vehicle communication, non-function signals are often treated in the same way as function signals and are transmitted, for example, in high resolution via the fieldbus system. However, such a transmission of non-function signals can represent an additional burden on computing power, resources, and data traffic within the vehicle.

SUMMARY

Against this background, a method, a management unit and a system for managing a data exchange between a vehicle-internal computing unit and a vehicle-external computing unit, as well as a computing unit, a computer program having the features of the present invention are provided. Advantageous example embodiment of the present invention are disclosed herein.

The vehicle-internal computing unit can be designed, for example, as a microcontroller or control device. The vehicle-external computing unit is a component extraneous to the vehicle and can be, for example, a server or a computing system, for example as part of so-called cloud computing. For example, special data are to be transmitted from the vehicle to the vehicle-external computing unit in order to be analyzed there or further processed, for example with the aid of a so-called digital twin of the vehicle.

For this purpose, in the context of a method according to an example embodiment of the present invention, function data or function signals of the vehicle-internal computing unit are received or read by a management unit, wherein the function data relate to an operation of the vehicle. The management unit in particular represents a data client and can expediently be implemented as a software unit in the vehicle-internal computing unit or in a further component of the vehicle. The function data are required in particular for the operation of the vehicle and are exchanged between vehicle components via a communication system of the vehicle, in particular via a fieldbus system such as CAN or Flexray. For example, the function data can be sensor data captured by sensors or control data for controlling actuators. For example, the vehicle-internal computing unit can receive the function data via the fieldbus system from a further unit of the vehicle, for example from a sensor or from a further control device. Alternatively or additionally, the function data can also be processed or generated within the vehicle-internal computing unit, for example if the vehicle-internal computing unit generates corresponding actuator data on the basis of current sensor data. Alternatively or additionally, the vehicle-internal computing unit can also transmit the function data via the fieldbus system to a further unit of the vehicle, for example to an actuator or to a further control device. The function data can be received or read in continuously by the management unit, for example, or can also be read in discretely under predefined conditions or when triggering events occur, for example at predefined times, after a predefined time interval has elapsed, and so on.

The management unit processes the received or read-in function data and generates data messages depending on the function data processed. In particular, the function data are first analyzed or preprocessed by the management unit, for example in order to read information from the function data which is to be analyzed or further processed in the vehicle-external processing unit. This information can then be converted or translated by the management unit into one or more data messages. Finally, the data messages are to be transmitted from the vehicle to the vehicle-external computing unit.

The generated data messages are stored in a memory unit in the management unit, in particular in a volatile memory unit, for example a RAM unit. The data messages can thus be cached or buffered by the management unit until they are actually to be transmitted to the vehicle-external computing unit, for example until the data messages are requested by the vehicle-external computing unit or until a suitable time for transmission arises, for example depending on current operating conditions, on a current resource utilization, on current data traffic, and so on.

The data messages stored in the memory unit are transmitted by the management unit to a communication interface of the vehicle-internal computing unit in order to transmit the data messages from the vehicle-internal computing unit to the vehicle-external computing unit. In this way, the management unit can instruct the vehicle-internal computing unit to transmit the data messages accordingly. For example, the data messages are transmitted from the computer-internal computing unit to a further, second vehicle-internal computing unit of the vehicle, for example to a central vehicle computer or to a telematics unit which has a communication interface to the outside, for example via a connection to a cellular network, and so on.

The data messages in particular represent non-function data or non-function signals which are not required for the operation of the vehicle. The present invention provides a possibility for distinguishing between function data and non-function data in vehicle-internal communication and data processing. Within the scope of the present invention, the generation, handling, buffering and forwarding of these non-function data within the vehicle are expediently carried out with the aid of the management unit up until the final transmission to the vehicle-external computing unit in such a way that the transmission and processing of function signals for the regular, correct operation of the vehicle are not impaired and no negative influence is exerted on the resources and computing power within the vehicle.

The management unit makes it possible to manage the transmission of non-function data between the vehicle-internal computing unit and the vehicle-external computing unit in an intelligent manner with high efficiency, flexibility, and configurability. High efficiency can in particular be made possible by a preprocessing of the function data close to the data source, in particular by event-specific signal or data message calculation and by specific transmission of the data messages with the aid of the management unit. High flexibility can be made possible in particular by data buffering within the management unit of the function data and the data messages. In this way, the generation and the time-shifted transmission of the data messages can be temporally decoupled. In addition, different (data processing or data transmission) protocols can be supported in this way, and high flexibility can be achieved in transmission frequency. A high configurability of the management unit can be realized, for example, by software switches, calibration parameters, and/or defined values of an in particular non-volatile memory. For example, by corresponding configuration of the management unit, a possibility for generating, processing, and transmitting special types of non-function signals or data messages can be implemented in the vehicle, in particular even after the vehicle has already been put into operation in the field. For example, access to special signals or signal types that are not part of the signals typically used at the time of manufacture of the vehicle can be made possible in this way.

The present invention makes it possible to save computing power, resources, data traffic and data transmission rates for data exchange between the vehicle-internal computing unit and the vehicle-external computing unit. The (pre-) processing of the function data is expediently carried out in the management unit close to the function data source, for example near the corresponding sensor or the corresponding vehicle-internal computing unit. For this reason, it is expediently not necessary to transmit the function data redundantly or additionally as raw data at high resolution several times over the vehicle bus. By implementing the management unit in a corresponding vehicle component, the data preprocessing can also take place using the internal electronic resources of the component, which can lead to optimized amounts of data for the entire data chain. In addition, the management unit can buffer data and can in particular make possible event-specific, non-continuous data capture that may be focused on relevant information and can avoid the transmission of unnecessary data. In particular, with the aid of the management unit, a predefined data transmission channel for data exchange of the vehicle with the vehicle-external processing unit can be provided, which channel can be used for different contents and in order, for example, to cover a future data requirement without the need for changes to interfaces. The management unit also makes it possible to collect function data from different, diverse components of the vehicle depending on the data application case. In this way, in particular a cross-domain approach can be provided which makes a data fusion possible across different subcomponents of the vehicle. For example, with the aid of the management unit, an intelligence can be provided that is one level above the subcomponents of the vehicle, but still within the vehicle.

According to an example embodiment of the present invention, the management of data exchange can expediently be implemented on three different calculation layers or architecture levels. The management unit can be implemented in a vehicle-internal computing unit layer or control unit layer as a first, lowest architecture level in the vehicle. The second vehicle-internal computing unit, which transmits the data messages generated by the management unit to the vehicle-external computing unit, can be implemented, for example, in a vehicle computer level as a second, middle architecture level in the vehicle. The vehicle-external computing unit, which receives and analyzes the data messages, can be implemented, for example, in an IT level as a third, uppermost architecture level outside the vehicle. In this way, in particular a flexible and distributed intelligence can be provided. A modularity can in particular be made possible by corresponding interfaces between the individual layers or levels. Complex data processing algorithms or models can be divided amongst the different layers.

According to one example embodiment of the present invention, the management unit is implemented or integrated in the vehicle-internal computing unit or in a second vehicle-internal computing unit of the vehicle. The management unit can expediently be provided as a software unit and executed by the corresponding computer-internal computing unit. By being implemented in the vehicle-internal computing unit itself, the management unit can expediently access the function data as close as possible to the data source, which makes the transmission of the function data to the management unit as lean as possible. For example, the second vehicle-internal computing unit can be designed as a central vehicle computer or as a telematics unit. Such a second vehicle-internal computing unit is in particular in communication with a plurality of further control devices and can receive a plurality of different function data from these during regular operation of the vehicle. By being implemented in such a second vehicle-internal computing unit, the management unit can in particular collect such different function data directly for preprocessing and transmission to the vehicle-external computing unit. In addition, the second vehicle-internal computing unit can expediently comprise an interface for communication to the outside, which makes it easier for the management unit to have the data messages stored temporarily in the memory unit transmitted to the vehicle-external computing unit.

According to one example embodiment of the present invention, the management unit is designed as an embedded software unit in the vehicle-internal computing unit or in the second vehicle-internal computing unit of the vehicle. The management unit is in particular designed as part of the overall software of the vehicle-internal computing unit, which can expediently comprise an algorithm software (ASW) and an infrastructure software (ISW). For example, the management unit can be distributed and be part of the two software parts ASW and ISW. For example, the vehicle-internal computing unit can store the function data in a proxy unit, in particular in the algorithm software, and transmit it from the proxy unit to the management unit. For example, the function data can be guided or routed from the one proxy unit to the management unit via a corresponding interface.

According to one example embodiment of the present invention, the management unit is formed in a separate or dedicated partition in the vehicle-internal computing unit or the second vehicle-internal computing unit of the vehicle. In this way, the management unit can in particular be implemented encapsulated, isolated and independent of the remaining functions of the vehicle-internal computing unit. In particular, a risk of negative effects or effects on other functions of the vehicle-internal computing unit can thus be reduced or minimized and functional safety requirements can be reduced. For example, the vehicle-internal computing unit can store the function data in a memory unit, for example a RAM unit, and the management unit can read the function data from this memory unit. For example, the function data can be transmitted from the proxy unit of the algorithm software to the memory unit of the infrastructure software and can be read in from there by the management unit. This memory unit can be provided, for example, exclusively for access by the management unit.

According to one example embodiment of the present invention, the transmission of the data messages by the management unit to the communication interface of the vehicle-internal computing unit comprises transmitting the data messages by the management unit to a first, direct or active communication interface of the vehicle-internal computing unit in order to transmit the output data from the vehicle-internal computing unit via a communication system of the vehicle, in particular via the fieldbus system, to the second vehicle-internal computing unit, in particular the central vehicle computer or the telematics unit, and to transmit said data from the second vehicle-internal computing unit to the vehicle-external computing unit. In this way, in particular an active, direct transmission of the data messages within the vehicle can be made possible. For example, the data messages can be assigned a low, subordinate priority, so that when transmitted via the vehicle field bus they do not influence or delay the transmission of higher-priority function signals required for the operation of the vehicle.

According to one example embodiment of the present invention, the transmission of the data messages by the management unit to the communication interface of the vehicle-internal computing unit comprises transmitting the data messages by the management unit to a second, indirect or passive communication interface of the vehicle-internal computing unit in order to transmit the data messages to the vehicle-external computing unit after reception of a predefined request and/or according to a predefined message transmission protocol. In this way, in particular a passive, indirect transmission of the data messages within the vehicle can be made possible. For example, the data messages can be cached within the management unit until the messages are requested by the vehicle-external computing unit, for example by a request for a request-response session. With the aid of the special, predefined message transmission protocol, the data messages can be transmitted to the second vehicle-internal computing unit on, for example, special communication paths within the vehicle, for example not via the fieldbus system.

According to one example embodiment of the present invention, a plurality of data frames are generated as data messages. The transmission of the data messages by the management unit to the communication interface of the vehicle-internal computing unit comprises transmitting a data stream, in particular as part of the active transmission, in the course of which the plurality of data frames are transmitted individually and continuously. Alternatively or additionally, the data messages can be transmitted as a package, in particular as part of passive transmission, wherein the plurality of data frames are transmitted together. For example, the processed function data can be divided into a plurality of data frames. Individual data parts can in each case be stored as a payload in the data frames. Such data frames that are related in terms of content can then be transmitted as a continuous data stream or together as package of frames belonging together.

According to one example embodiment of the present invention, each data frame has a first, static part and a second, dynamic part. The first part has a first identification feature and a second identification feature, wherein the first identification feature comprises information for translation of a payload and wherein the second identification feature characterizes associated data frames. The second part has in each case a payload. Each data frame is in particular an 8-byte frame. The first identification feature represents, for example, a message identifier which includes information about the data translation of the dynamic part of the data frame. The second identification feature represents, for example, an event identifier which, for example, defines which individual data frames belong together and reflects a temporally synchronous event. The second, dynamic part contains, for example, signals of a continuous data stream during an active measurement time or results of a data calculation carried out during the measurement time. Irrespective of which data transmission variant is used, whether the data messages are to be transmitted in the course of active or passive transmission, the individual data frames of the active data stream or of the passive data packet transmission and the content thereof are expediently in each case removed from the volatile memory of the management unit. Since each data frame has a corresponding first, static part with the corresponding first and second identification features as message or event identifiers, the size of the data packet can expediently be freely selected. In order to avoid data losses, for example recognizable by the occupied memory capacity of the memory unit of the management unit or by non-continuously increasing event identifiers, the size of the data packets and the readout frequency are expediently dimensioned accordingly for the approach of passive data transmission.

According to one example embodiment of the present invention, update data are received or read by the management unit from the vehicle-external computing unit. For example, the second computer unit internal to the vehicle can receive these update data and forward them to the corresponding vehicle-internal computing unit, from which the update data are received or read by the management unit by means of the proxy unit and/or the corresponding memory unit. The update data are checked or tested in an isolated or secured or protected environment or runtime environment within the management unit, e.g. within a so-called sandbox. The update data can, for example, have new or revised executable software which is to be executed by the management unit and/or a vehicle unit, for example a control device. In addition, the update data can also have, for example, changed configuration settings for the management unit and/or further vehicle units, for example control devices. For example, the update data can be part of a software update in the course of a so-called over-the-air update. Furthermore, the update data can be used, for example, to make possible extended, individual configuration options during the runtime, wherein, for example, from the vehicle-external computing unit a vehicle manufacturer or fleet operator of a plurality of vehicles can configure which component in which vehicle should provide what type of non-function signals. Expediently, the update data in the management unit can thus first be checked for functional and information-related safety before the updates are executed or taken over in the course of regular operation. For this purpose, exclusive resources can expediently be reserved for the isolated environment. In addition, all signals required for testing the update data can expediently be supplied to the isolated environment. Such an isolated environment can particularly expediently be realized if the management unit is implemented in a dedicated partition.

According to one example embodiment of the present invention, second data messages are generated by the management unit depending on the checking of the update data. These second data messages expediently comprise results of the checking of the updates. These second data messages are then, corresponding to the above-explained (first) data messages, transmitted to the vehicle-external computing unit, in that the second data messages are stored in the in particular volatile memory unit in the management unit and in that these second data messages stored in the memory unit are transmitted to the corresponding communication interface of the vehicle-internal computing unit by the management unit in order to transmit the second data messages from the computer-internal computing unit to the vehicle-external computing unit. Expediently, behavior within the isolated environment can thus be recorded during the update data check and transmitted as a checking result to the computer-external processing unit. If the check was successful, an instruction can be output by the computer-external computing unit that the update is to be adopted, for example that the new or revised software is to be executed or the new configuration settings are to be adopted. By means of such preliminary checking of the update data in the field, the development, publication and release of software or configuration updates for the management unit and for further vehicle components can be made simpler and safe, since the risk of negative side effects and effects on other functions of the vehicle can be reduced or minimized.

According to one example embodiment of the present invention, the management unit or individual functions of the management unit can be configured. For example, the management unit or individual functions can be activated or deactivated. This configuration can take place in the course of a compilation process of the vehicle-internal computing unit, for example by means of at least one software switch. For example, the management unit can be deactivated by default and each software build process can be activated via corresponding compiler switches. Alternatively or additionally, the configuration can also take place by means of a trigger signal and/or by means of a configuration or calibration parameter and/or by means of an entry in an in particular non-volatile memory unit of the vehicle-internal computing unit. For example, a signal-triggered signal calculation and signal transmission of the management unit can be configured by means of the configuration parameter.

In addition, the configuration of the management unit can also be made possible via the memory entry of, for example, 4 bytes in the non-volatile memory unit of the vehicle-internal computing unit. In this way, for example, two mechanisms can be provided for configuring the management unit at runtime which are logically linked to one another. This redundancy makes possible a high flexibility for the configuration of the management unit, for example when the configuration parameter is frozen in a software build version and can no longer be changed at runtime but the entry in the non-volatile memory unit can still be adjusted at runtime. For example, in this way, it can be set or predefined for each specific software version which signals are to be transmitted, which communication path is to be used, which vehicle is to transmit data, and so on.

According to one example embodiment of the present invention, the management unit comprises a ring buffer memory unit. In this ring buffer memory unit, the received or read-in function data can be cached before their processing. In addition, the generated data messages can be cached in the ring buffer memory unit, in particular before they are transmitted to the volatile memory unit of the management unit. By means of this ring buffer memory unit, a possibility for caching can be provided in the management unit during increased processing or computing effort, for example when signal generation is initiated by the management unit by means of the corresponding trigger signal.

According to one example embodiment of the present invention, the generation of the data messages comprises a data compression by the management unit, depending on the processed function data. The data compression is thus expediently carried out in the vehicle by the management unit, and a corresponding decompression of the received data messages can be carried out in the vehicle-external computing unit. By compression, for example, time series can be transmitted very efficiently by means of individual points.

The present invention further relates to a management unit which is configured to carry out an embodiment of the method according to the present invention. The advantages and embodiments of the management unit according to the present invention are apparent in a corresponding manner from the above description of the method according to the present invention. As explained above, the management unit is expediently designed as a software unit and is implemented in particular in the corresponding vehicle-internal computing unit itself or in the second vehicle-internal computing unit of the vehicle.

A computing unit according to the present invention, for example a control device of a vehicle, comprises an embodiment of the management unit according to the present invention and is thus configured, in particular in terms of programming, to carry out an embodiment of the method according to the present invention.

A system according to the present invention for managing a data exchange between a vehicle-internal computing unit has a second vehicle-internal computing unit, in particular a central vehicle computer or a telematics unit, an embodiment of the management unit according to the present invention, and the vehicle-external computing unit. The management unit is implemented as a software component in the second vehicle-internal computing unit. The second vehicle-internal computing unit is configured to be brought into communication connection with the corresponding vehicle-internal computing unit via a first interface. The second computer unit internal to the vehicle is in communication with the vehicle-external computing unit via a second interface.

The management unit according to the present invention can, for example, be provided as an independent ("stand-alone") unit or independent data client for implementation in a corresponding computer-internal computing unit. In addition, by means of the system according to the present invention, a combined or prefabricated package can also be provided, in which the management unit is already implemented in a prefabricated manner in the second vehicle-internal computing unit and wherein a cloud or server intelligence can be provided by the computer-external computing unit.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, Intranet, etc.). Such a download can be wired or wireless (e.g. via a WLAN network or a 3G, 4G, 5G or 6G connection, etc.).

Further advantages and embodiments of the present invention can be found in the description herein and the figures.

The present invention is shown schematically in the figures on the basis of exemplary embodiments and is described below with reference to the figures.

BRIEF DESCRIPTION OF THE DRAWINGS

FIG. 3 schematically shows a computing unit which is configured to carry out a preferred example embodiment of the method according to the present invention.

DETAILED DESCRIPTION OF EXAMPLE EMBODIMENTS

Figure 1:
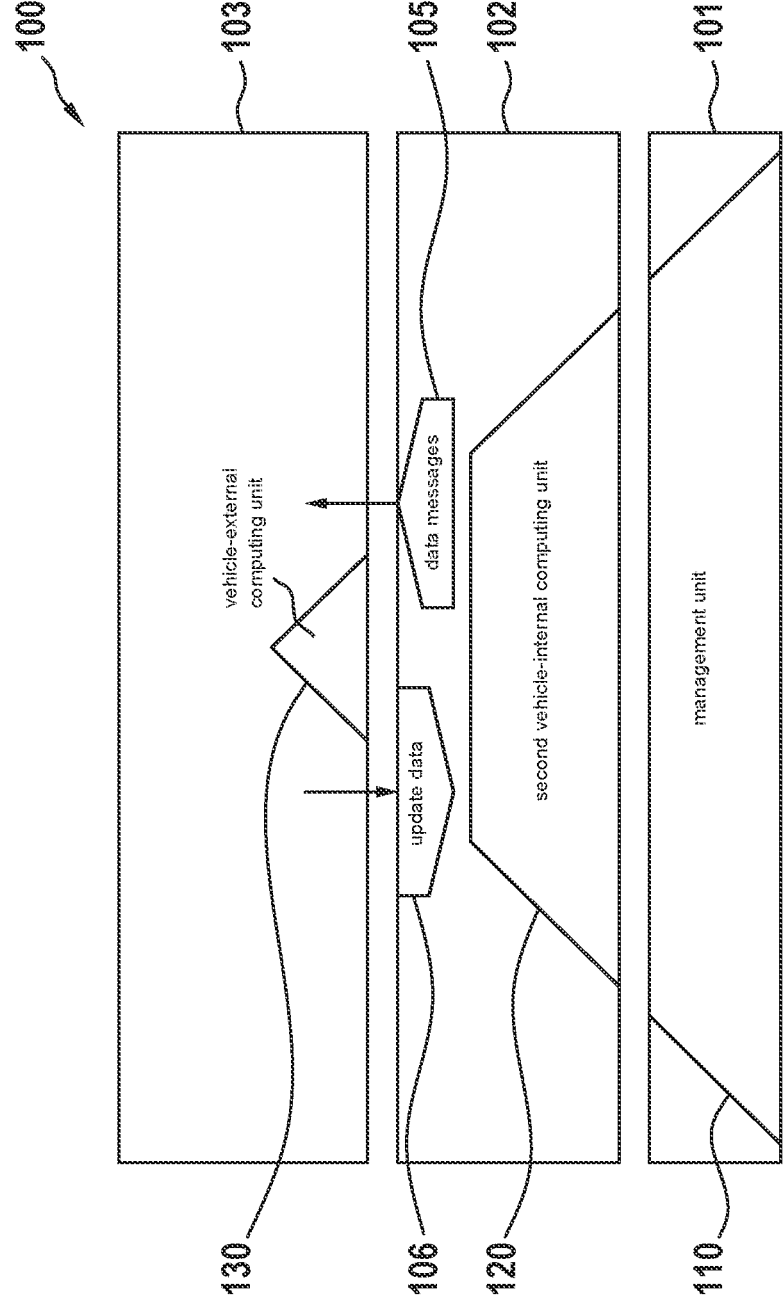
FIG. 1 schematically shows a system for managing a data exchange between a vehicle-internal computing unit and a vehicle-external computing unit according to an example embodiment of the present invention.

FIG. 1 schematically shows a system for managing a data exchange between a vehicle-internal computing unit, for example a control device, and a vehicle-external computing unit according to an embodiment of the present invention and is denoted by 100.

The vehicle-external computing unit is denoted by 130 in FIG. 1 and can be, for example, a server or a so-called cloud.

The system 100 has an embodiment of a management unit 110 according to the present invention which is designed as a software unit and can be implemented into the control device itself or in a further vehicle-internal computing unit of the vehicle. The management unit 110 is provided to receive or read in function data of the control unit, wherein these function data relate to an operation of the vehicle and, for example, can comprise sensor data and/or actuator data. These function data are (pre-)processed by the management unit 110 and translated into data messages 105 which are to be transmitted to the vehicle-external computing unit. These generated data messages 105 are stored or cached in a memory unit in the management unit 110, in particular in a volatile memory unit, for example a RAM memory. The management unit 110 can initiate the transmission of these cached data messages 105 by transmitting the data messages 105 from the volatile memory unit to a communication interface.

From the communication interface, the data messages 105 are transmitted to the server or the cloud 130 via a second vehicle-internal computing unit 120. This second vehicle-internal computing unit 120 can, for example, be a central vehicle computer or a telematics unit of the vehicle with a communication interface to the outside, for example with a connection to a cellular network, etc.

In addition, update data 106 can also be transmitted from the vehicle-external computing unit 130 to the second vehicle-internal computing unit 120, which can forward these update data 106 to the management unit 110. In the management unit 110, these update data can then be checked in an isolated environment.

The management of the data exchange between the control device and the server or the cloud 130 can thus be implemented on three different calculation layers or architecture levels, wherein the management unit 110 is implemented in a computing unit layer or control unit layer 101 as the first, lowest architecture level in the vehicle, wherein the second vehicle-internal computing unit 120 is implemented in a vehicle computer level 102 as a second, middle architecture level in the vehicle, and wherein the vehicle-external computing unit 130 is implemented in an IT level 103 as a third, uppermost architecture level outside the vehicle.

According to one embodiment of the present invention, the management unit 110 can also be implemented in the second vehicle-internal computing unit 120, and the system 100 consisting of the management unit 110, the second vehicle-internal computing unit 120, and the vehicle-external computing unit 130 can be provided as a combined or prefabricated package.

According to one embodiment of the present invention, the management unit 110 can also be provided as an independent ("standalone") unit or independent data client and can be implemented in the corresponding computing unit or in the corresponding control unit of the vehicle, as will be explained below with reference to FIGS. 2 and 3.

Figure 2:
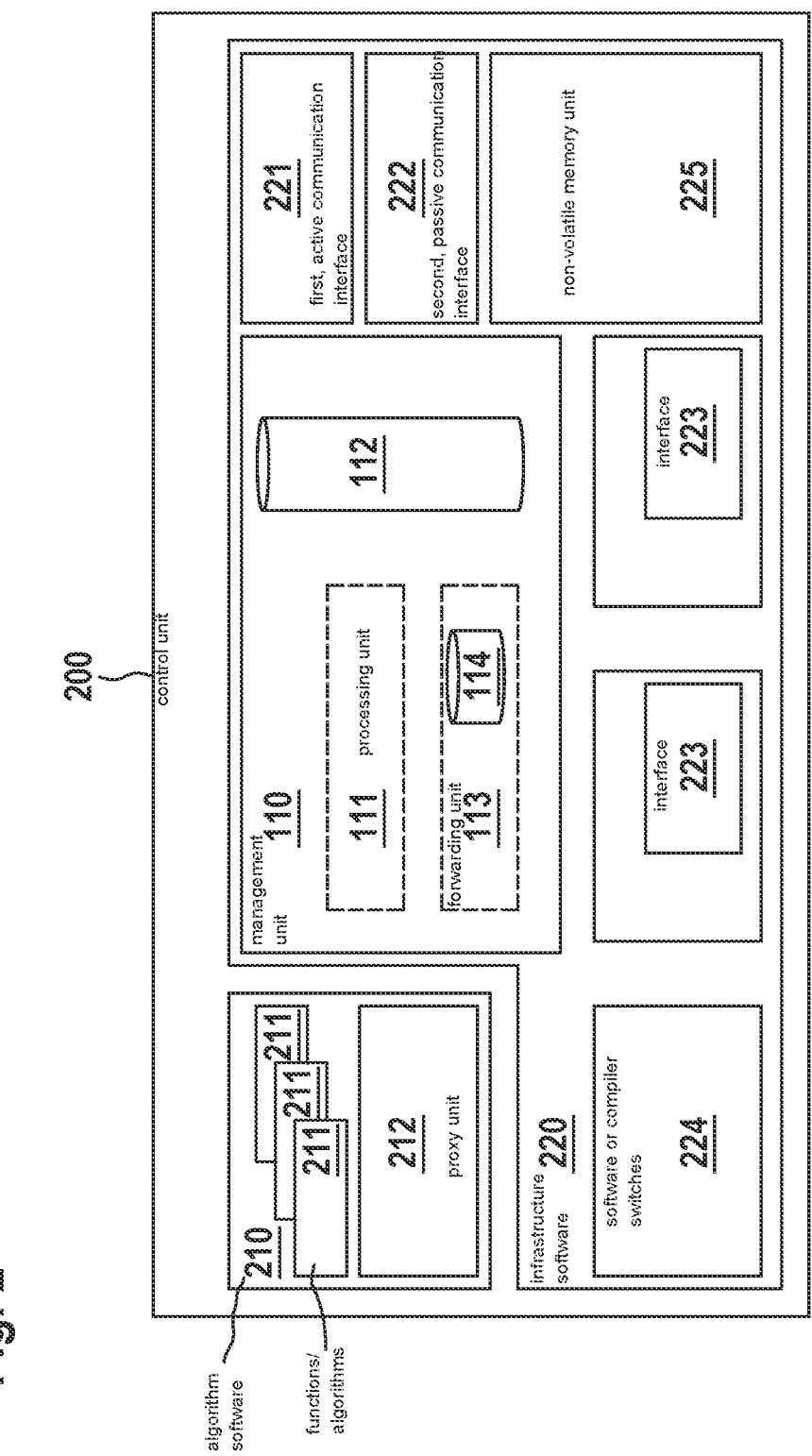
FIG. 2 schematically shows a computing unit which is configured to carry out a preferred example embodiment of the method according to the present invention.

FIG. 2 schematically shows a corresponding vehicle-internal computing unit in the form of a control unit and is denoted by 200.

An overall software of the control unit 200 has an algorithm software (ASW) 210 and an infrastructure software (ISW) 220. Functions or algorithms 211 for data processing can be executed in the algorithm software 210. In addition, the algorithm software 210 has a proxy unit 212 for storing data. The function data can be forwarded by the algorithm software 210 from the proxy unit 212 to the management unit 110.

The infrastructure software 220 has a first, active communication interface 221, via which the control device 200 can be connected, for example, to a communication system of the vehicle, for example to a fieldbus system such as CAN, Flexray, etc. In addition, the infrastructure software 220 has a second, passive communication interface 222, via which the control device 200 can be connected, for example, to the second vehicle-internal computing unit 120. The infrastructure software 220 can furthermore have further interfaces 223 via which the control device 200 can be connected to further units of the vehicle. The infrastructure software 220 also has software switches or compiler switches 224 which can be changed in the course of a compilation process or a software build process. In addition, the infrastructure software 220 has a non-volatile memory unit 225.

The management unit 110 can be implemented as embedded software in the control device 200 and can be part of not only the algorithm software 210 but also the infrastructure software 220. The management unit 110 can comprise a unit 111 for processing the function data and for generating the data messages, as well as the volatile memory unit 112 for storing the generated data messages. In addition, the management unit 110 can comprise a unit 113 for forwarding the generated data messages to the volatile memory unit 112. This unit 113 can also have a ring buffer memory unit 114 in which the function data can be cached prior to their processing and the generated data messages can be cached prior to their transmission to the volatile memory unit 112. The management unit 110 can generate a plurality of data frames as data messages.

By the transmission of the cached data messages from the volatile memory unit 112 to the first, active communication interface 221, the data messages can be transmitted via the communication system of the vehicle to the second vehicle-internal computing unit 120 and from this to the vehicle-external computing unit 130, for example as a data stream, wherein a plurality of data frames are transmitted individually and continuously.

By the transmission of the data messages from the volatile memory unit 112 to the second, passive communication interface 221, the data messages can be transmitted to the vehicle-external computing unit 130, for example after reception of a predefined request or according to a predefined message transmission protocol. For example, in the course of this, a plurality of the data frames can be transmitted as a common data packet.

By means of the software switch 224, the management unit 110 can be configured, for example, during a compilation process of the control unit 200. In addition, the configuration of the management unit 110 can also be configured, for example, at the runtime of the control unit 200 via a memory entry of, for example, 4 bytes, in the non-volatile memory unit 225.

FIG. 3 schematically shows a vehicle-internal computing unit in the form of a control unit 300 according to a further embodiment of the present invention.

Identical or structurally identical elements of the control unit 300 from FIG. 3 are in each case denoted by a reference number incremented by "100" in comparison with the control device 200 in FIG. 2 and in order to avoid repetitions are not be explained again.

In contrast to the embodiment shown in FIG. 2, the management unit 110 is implemented in the control device 300 in a separate, dedicated partition 330.

A volatile memory unit 326 can be provided in the infrastructure software 320, for example a RAM unit, in which the function data are stored and from which the management unit 110 reads the function data. This memory unit 326 can be provided, for example, exclusively for access by the management unit 110.

In addition, an isolated runtime environment 331 can be provided in partition 330. When the second vehicle-internal computing unit 120 receives update data 106 from the vehicle-external computing unit 130, these update data can be checked or tested by the management unit 110 in this isolated runtime environment 331. The update data can have, for example, new or revised executable software or changed configuration settings for the management unit 110 or the control device 200. Depending on this checking of the update data, second data messages which include results of the checking are generated by the management unit 110. These second data messages are then stored in the volatile memory unit 112 of the management unit 110 in accordance with the (first) data messages explained above and transmitted from there to the first or second communication interface 321, 322 in order to be transmitted to the computer unit 130 outside the vehicle.

These second data messages and the (first) data messages explained above represent in particular non-function data or non-function signals which are not required for the operation of the vehicle. The present invention provides a possibility for distinguishing between function and non-function data in vehicle-internal communication and data processing. The management unit 110 makes it possible to manage the transmission of such non-function data between the control device 200 or 300 and the vehicle-external computing unit 130 in an intelligent manner with high efficiency, flexibility, and configurability.

What is claimed is:

1. A method, by a management unit, for managing a data exchange between a vehicle-internal computing unit of a vehicle and a vehicle-external computing unit, the vehicle-internal computing unit being one of a plurality of vehicle-internal computing units that are communicatively interconnected by a vehicle communication bus system of the vehicle, wherein data of the vehicle-internal computing unit is classified into (i) function data that is transmitted in real-time over the vehicle communication bus system so that it is accessible by the plurality of vehicle-internal computing units for real-time operation control of the vehicle and (ii) non-function data, the method comprising the following steps:

the management unit obtaining the non-function data from the vehicle-internal computing unit, wherein the obtaining includes either:

(I) accessing the data of the vehicle-internal computing unit and performing the classification by the management unit, the management unit being integral with the vehicle-internal computing unit; or (II) receiving, from the vehicle-internal computing unit and in a non-real-time manner, the non-function data after performance of the classification by the vehicle-internal computing unit, the management unit being separate from the vehicle-internal computing unit;

buffering the non-function data or derivative data generated from the non-function data in a memory of the management unit; and transmitting, by the management unit, data messages to the vehicle-external computing unit via a communication interface other than the vehicle communication bus system, the messages providing the buffered non-function data or the derivative data and the transmitting being performed in a non-real-time manner according to a scheduling condition and/or in response to a request from the vehicle-external computing unit, wherein the non-function data is not transmitted in real-time over the vehicle communication bus system.

2. The method according to claim 1, wherein the management unit is implemented in the vehicle-internal computing.

3. The method according to claim 2, wherein: the management unit is formed in an respective partition in the vehicle-internal computing unit.

4. The method according to claim 1, wherein the transmission of the data messages by the management unit includes:

transmitting the data messages by the management unit via a first communication interface of the vehicle-internal computing unit from the vehicle-internal computing unit to a second one of the vehicle-internal computing units of the vehicle for transmission from the second vehicle-internal computing unit to the vehicle-external computing unit; and/or transmitting the data messages by the management unit via a second communication interface of the vehicle-internal computing unit to the computer-external processing unit after reception of a prespecified request and/or according to a predefined message transmission protocol.

5. The method according to claim 1, wherein a plurality of data frames are generated as the data messages, and wherein the transmission of the data messages includes:

transmitting a data stream in the course of which the plurality of data frames are transmitted individually, and/or transmitting a data packet in the course of which the plurality of data frames are transmitted together.

6. The method according to claim 5, wherein each data frame has a respective first part and a respective second part, wherein the first part has a first identification feature and a second identification feature, wherein the first identification feature includes information for translation of a payload, and wherein the second identification feature characterizes data frames that belong together, wherein each of the second parts has a payload.

7. The method according to claim 1, further comprising the following steps:

receiving or reading in, by the management unit, update data from the vehicle-external computing unit;

checking the update data in an isolated environment within the management unit.

8. The method according to claim 7, further comprising the following steps:

generating second data messages by the management unit depending on the checking of the update data;

storing the second data messages in the memory in the management unit; and transmitting the second data messages stored in the memory by the management unit via the communication interface in order to transmit the second data messages to the vehicle-external computing unit.

9. The method according to claim 1, further comprising:

configuring the management unit or individual functions of the management unit: (i) in the course of a compilation process of the vehicle-internal computing unit, and/or (ii) using a trigger signal, and/or (iii) using a configuration parameter, and/or (iv) using an entry in a memory unit of the vehicle-internal computing unit.

10. The method according to claim 1, further comprising:

caching the non-function data and/or the generated data messages in a ring buffer memory unit in the management unit.

11. The method according to claim 1, wherein the generation of the data messages includes applying, by the management unit, a data compression to the non-function data.

12. A management unit configured to manage a data exchange between a vehicle-internal computing unit of a vehicle and a vehicle-external computing unit, the vehicle-internal computing unit being one of a plurality of vehicle-internal computing units that are communicatively interconnected by a vehicle communication bus system of the vehicle, wherein data of the vehicle-internal computing unit is classified into (i) function data that is transmitted in real-time over the vehicle communication bus system so that it is accessible by the plurality of vehicle-internal computing units for real-time operation control of the vehicle and (ii) non-function data, the management unit comprising:

a processor;
a memory; and
a communication interface other than the vehicle communication bus system;
wherein the processor is configured to:
obtain the non-function data from the vehicle-internal computing unit, wherein the obtainment includes either:
(I) accessing the data of the vehicle-internal computing unit and performing the classification by the management unit, the management unit being integral with the vehicle-internal computing unit; or
(II) receiving, from the vehicle-internal computing unit and in a non-real-time manner, the non-function data after performance of the classification by the vehicle-internal computing unit, the management unit being separate from the vehicle-internal computing unit;
buffer the non-function data or derivative data generated from the non-function data in the memory of the management unit; and
transmit data messages to the vehicle-external computing unit via the communication interface, the messages providing the buffered non-function data or the derivative data and the transmitting being performed in a non-real-time manner according to a scheduling condition and/or in response to a request from the vehicle-external computing unit, wherein the non-function data is not transmitted in real-time over the vehicle communication bus system.

13. A vehicle-internal computing unit of a vehicle, the vehicle-internal computing unit being one of a plurality of vehicle-internal computing units that are communicatively interconnected by a vehicle communication bus system of the vehicle, the vehicle-internal computing unit comprising a management unit configured to manage a data exchange between the vehicle-internal computing unit and a vehicle-external computing unit, the management unit comprising:

a memory; and
a processor, wherein the processor is configured to:
obtain data of the vehicle-internal computing unit;
classify data of the vehicle-internal computing unit into (i) function data and (ii) non-function data;
based on the classification, transmit the function data in real-time over the vehicle communication bus system so that it is accessible by the plurality of vehicle-internal computing units for real-time operation control of the vehicle, wherein, based on the classification, the non-function data is not transmitted in real-time over the vehicle communication bus system;
buffer the non-function data or derivative data generated from the non-function data in the memory of the management unit; and
provide the buffered non-function data or the derivative data for transmission in data messages to the vehicle-external computing unit via a communication interface other than the vehicle communication bus system, the transmission being performed in a non-real-time manner according to a scheduling condition and/or in response to a request from the vehicle-external computing unit.

14. A non-transitory machine-readable storage medium on which is stored a computer program for managing a data exchange between a vehicle-internal computing unit of a vehicle and a vehicle-external computing unit, the vehicle-internal computing unit being one of a plurality of vehicle-internal computing units that are communicatively interconnected by a vehicle communication bus system of the vehicle, wherein data of the vehicle-internal computing unit is classified into (i) function data that is transmitted in real-time over the vehicle communication bus system so that it is accessible by the plurality of vehicle-internal computing units for real-time operation control of the vehicle and (ii) non-function data, the computer program being executable by a processor of a management unit and, when executed by the processor, causing the management unit to perform the following steps:

obtaining the non-non-function data from the vehicle-internal computing unit, wherein the obtaining includes either:

(I) accessing the data of the vehicle-internal computing unit and performing the classification by the management unit, the management unit being integral with the vehicle-internal computing unit; or (II) receiving, from the vehicle-internal computing unit and in a non-real-time manner, the non-function data of after performance of the classification by the vehicle-internal computing unit, the management unit being separate from the vehicle-internal computing unit;

buffering the non-function data or derivative data generated from the non-function data in a memory of the management unit;

transmitting data messages to the vehicle-external computing unit via a communication interface other than the vehicle-communication bus system, the messages providing the buffered non-function data or the derivative data and the transmitting being performed in a non-real-time manner according to a scheduling condition and/or in response to a request from the vehicle-external computing unit, wherein the non-function data is not transmitted in real-time over the vehicle communication bus system.

15. A system comprising:

a vehicle-external computing unit; and a vehicle that includes:

a vehicle communication bus system; and a plurality of vehicle-internal computing units that are communicatively interconnected by the vehicle communication bus system;

wherein:

the vehicle includes a management unit that includes a processor, a memory, and a communication interface other than the vehicle communication bus system; and with respect to a respective one of the vehicle-internal computing units:

data of the vehicle-internal computing unit is classified into (i) function data that is transmitted in real-time over the vehicle communication bus system so that it is accessible by the plurality of vehicle-internal computing units for real-time operation control of the vehicle and (ii) non-function data; and the processor of the management unit is configured to:

obtain the non-function data by the management unit from the respective vehicle-internal computing unit, wherein the obtainment includes either:

(I) accessing the data of the respective vehicle-internal computing unit and performing the classification by the management unit, the management unit being integral with the respective vehicle-internal computing unit; or (II) receiving, from the respective computing unit and in a non-real-time manner, the non-function data after performance of the classification by the respective vehicle-internal computing unit, the management unit being separate from the vehicle-internal computing unit;

buffer the non-function data or derivative data generated from the non-function data in the memory of the management unit; and transmit the data messages to the vehicle-external computing unit via the communication interface, the messages providing the buffered non-function data or the derivative data and the transmitting being performed in a non-real-time manner according to a scheduling condition and/or in response to a request from the vehicle-external computing unit, wherein the non-function data is not transmitted in real-time over the vehicle bus system.

16. The system according to claim 15, wherein the management unit is one of a plurality of managements units, each of which (I) is part of a respective one of the plurality of vehicle-internal computing units, and (II) performs the classification with respect to data of the respective vehicle-internal computing unit of which the respective management unit is a part.

17. The system according to claim 15, wherein the management unit receives respective non-function data from, and classified by, the plurality of vehicle-internal computing units, without the non-function data being provided to the management unit in real-time over the vehicle communication bus system, the management unit transmitting to the vehicle-external computing unit messages corresponding to the non-function data received by the management unit from the plurality of vehicle-internal computing units.

* * * * *